United States Patent Office 3,506,544
Patented Apr. 14, 1970

3,506,544
METHOD OF DETERMINING MICROBIAL
POPULATIONS, ENZYME ACTIVITIES,
AND SUBSTRATE CONCENTRATIONS
BY ELECTROCHEMICAL ANALYSIS
Herbert P. Silverman, Orange, and Jon M. Brake, Anaheim, Calif., assignors to Magna Corporation, Anaheim, Calif., a corporation of California
Filed Oct. 9, 1964, Ser. No. 402,788
Int. Cl. B01k *3/00;* C12k *1/04*
U.S. Cl. 204—1                                       11 Claims

ABSTRACT OF THE DISCLOSURE

A method of analysis for one of the components of an enzyme-catalyzed reaction. An enzyme and first and second substrates are provided in a suitable conductive medium, the first substrate being a redox couple and the second substrate being adapted to react chemically and change the oxidation state of the redox couple. Electrodes are then employed to effect a chemical reaction changing the oxidation state of the redox couple, and the resulting change is electrochemically determined by amperometric or amperostatic analysis.

---

This invention relates to the determination of various factors, relative to enzyme reactions, by an improved electrochemical method. Various aspects of the method relate to analysis for enzyme activity and substate concentration. The invention further relates to the determination of microbial populations in an accurate and sensitive manner.

The action of enzymes is involved in all biological and biochemical processes. Thus, biology might be defined as encompassing those processes which are catalyzed by enzymes instead of by more conventional catalysts such as platinum, acids, bases, etc. Many industrial processes take advantage of enzyme catalysis, the enzymes being employed (for example) as more or less purified enzyme preparations, extracts of cells, and whole cells. Examples of substantially purified enzyme preparations include many kinds of amylases, which remove starch from fruit juices, fortify the flour used to make bread, and size textiles before weaving. Examples of enzymes in whole cells include various species of bacteria, the yeast employed in brewing, and the molds used in the making of penicillin and related pharmaceuticals.

Instead of being beneficial, enzyme activity can be destructive (or at least highly obstructive) to certain industrial operations. Such destructive activity usually results from the growth of unwanted microorganisms in the system, for example in the pulp and paper industry and in the food-processing industry.

Despite the fact that the control of enzyme activity, and of microbial populations, are important industrial problems, conventional methods for making the required measurements of such activity and populations are slow and cumbersome, and do not lend themselves to modern methods of control. Thus, for example, conventional methods employed relative to commercial processes are performed by culture techniques requiring time periods on the order of hours or days, and wherein the judgment of the operator is a highly important factor.

It is therefore an object of the present invention to provide an improved method of determining or measuring enzyme activity, and/or the population of microorganisms, such method being characterized by extremely high sensitivity and rapidity, and by a direct electrical read-out which produces quantitative data when desired.

An additional object is to provide an enzyme-activity determining method which may be performed by simple and compact apparatus, and with only a minimum quantity of sample.

As indicated above, the determination of populations of various microorganisms constitutes a major feature of the present method. Of these, bacteria are of most practical importance because they are very widely distributed. Both aerobic (i.e., requiring oxygen for metabolism) and anaerobic bacteria are important industrially. Examples of aerobic bacteria are: *Escherichia coli, Proteus vulgaris, Bacillus megaterium, Serratia marcescens, Bacillus subtilis* and *Bacillus globigii*. Examples of anerobic bacteria are *Clostridium butyricium* and *Desulfovibrio desulfuricans*.

It is, therefore, another important object of the present invention to provide a simple, rapid and sensitive method of determining microbial populations, which method is effective for testing relative to either aerobic bacteria or anaerobic bacteria.

The determination of the presence and/or concentration of a substrate in an enzyme-catalyzed reaction is another major field of activity to which the present method relates. For certain purposes it is only necessary that the presence of a particular substrate be identified. For other purposes, it is important that the concentration of such substrate be determined. The determination must be highly accurate and sensitive, particularly since the substrate may only be present in relatively small concentrations. As one example of the need for accuracy and sensitivity, it is pointed out that the concentration of glucose in the blood is less than about 0.01 M, and that small changes in such concentration are physiologically important.

In view of the above, it is an additional object of the present invention to provide a method of determining the presence and/or concentration of a substrate in an enzyme reaction, in a sensitive, rapid, simple and accurate manner.

Various classes of enzymes may be the subjects of the method of this invention. Among these are oxidation-reduction enzymes, hydrolytic enzymes, proteolytic enzymes, etc. The oxidation-reduction enzymes are the most easily detected by the present method, it being a major feature of the invention that such enzymes may be detected by a direct, one-step reaction. Oxidation-reduction (redox) enzymes are largely made up of the oxidases, which catalyze reactions with oxygen, and the dehydrogenases, which catalyze removal of hydrogen. Examples of oxidases measurable by the present method are glucose oxidase, xanthine oxidase and L-amino acid oxidase. Examples of dehydrogenases are alcohol dehydrogenase and lactic dehydrogenase.

As noted above, the activity of certain nonredox enzymes, including (for example) hydrolytic and proteolytic enzymes, may also be measured by the present invention. This is accomplished by an extension of the method, wherein two sequential reactions are employed. For example, the activity of the hydrolytic enzyme amylase can be measured as the catalyst for the decomposition of starch into smaller fragments.

It is, therefore, a further object of the present invention to provide a simple and readily calibrated method of determining various factors, such as enzyme activity and substrate concentration, relative to oxidation-reduction enzymes and associated substrates.

An additional object of the invention is to provide a method of determining such factors relative to non-redox enzymes, by means of sequential reactions.

The above and other objects of the invention will be more fully understood upon consideration of the following specification and claims, considered in conjunction with the drawings wherein:

KINETICS OF ENZYME REACTIONS

In order that the present method may be clearly understood, there will first be discussed certain mathematical relationships which relate to the kinetics of enzyme-catalyzed reactions. Thus, the following general reaction may be postulated:

$$A + B \xrightarrow{\text{enzyme}} C + D \quad (1)$$

The exact expression for the rate of this reaction, in terms of the concentrations of reactants (substrates) and catalyst, is a complex function (because of the special ways in which enzymes enter into the reaction mechanism) which need not be stated here. The indicated complex function may be greatly simplified if: (a) the concentration of reactant B is relatively large in comparison to the concentrations of other reactants, and (b) the enzyme is saturated with both of the substrates A and B. The rate expression then becomes:

$$\text{Rate} = -\frac{d(A)}{dt} = \frac{k_1(E)}{1 + k_2/(A)} \quad (2)$$

where $k_1$ and $k_2$ are constants, and (A) and (E) represent the activities of the reactant A and the enzyme, respectively.

An additional simplification is introduced if only the initial stage of the reaction is used as the basis for measurements. When this is done, the concentration of component A remains essentially constant throughout the measurement period, and may be considered equal to the original concentration thereof (which may be denoted $(A)_o$). The expression for the initial rate thus reduces to:

$$-\frac{d(A)}{dt} = k_3(E) \quad (3)$$

where $$k_3 = \frac{k_1}{1 + k_2/(A)_o} \quad (4)$$

The reaction rate may also be expressed in terms of the rate of change of the concentrations of the various reactants or products, as follows:

$$-\frac{d(A)}{dt} = -\frac{d(B)}{dt} = \frac{d(C)}{dt} = \frac{d(D)}{dt} \quad (5)$$

It will be noted from expression (5) that a measurement of the rate of change of any one of the reactants or products suffices to determine the reaction rate. By measurement of the initial reaction rate in the presence of two or more different values of (E), the constant $k_3$ can be evaluated for any chosen value of $(A)_o$ and $(B)_o$ (which denotes the initial concentration of component B).

Important advantages (in addition to simplification of the relationship between reaction rate and enzyme activity) result from the measurement of rate during the initial stage of the reaction. Referring to Equation 2, it will be seen that the reaction rate decreases as the concentration of A, (A), (and hence that of B) decreases as the reaction proceeds. It follows that maximum sensitivity may be achieved by measuring low concentrations of enzyme catalyst during a time interval when the reaction rate is maximum, that is to say at the very beginning of the reaction. Additional sensitivity is achieved by making the initial concentrations of A and B as large as possible while still remaining compatible with the system involved. The concentrations of such reactants are often limited by the solubility of the medium, or by the inhibition of enzyme activity above a certain concentration.

In order to achieve the advantages described above, it is necessary to employ an analytical method which is capable of measuring small changes in concentrations of reactants or products during the initial stage of the reaction. The above-mentioned conventional methods for assay of enzyme activity, although theoretically capable of such measurements, are able to do so only with great difficulty. Many of such prior-art methods are of the spectrophotometric type, wherein the change in optical density of a solution at a selected wave length is used to follow an enzyme-catalyzed reaction. Such colorimetric methods require complex, expensive and cumbersome equipment to make the sensitive measurements required. Furthermore, the results are subject to large errors if there is any turbidity in the solution. Very often, it is highly difficult or inconvenient to remove such turbidity.

There will next be described an electrochemical method which is capable of use with many different types of enzyme systems, which is capable of measuring extremely small changes in concentrations of reactants or products during the initial stage of the reaction, and which is capable of operating without interference relative to solutions having various natural colors, and showing various degrees of turbidity.

METHOD OF DETECTING AND MEASURING ENZYME ACTIVITY

Stated in one manner, the present method comprises introducing an enzyme, an electrochemically-reversible redox couple, a substrate, and a compatible conductive medium into a cell, measuring the electrometric properties of the solution, and relating the electrometric properties of the solution to the catalytic activity of the enzyme.

Stated in another manner, the electrochemical method of the present invention comprises generating or consuming an electrochemically active substance the concentration of which is related to the activity of the enzymes, and measuring the rate of change in concentration of such active substance by means of an electrochemical cell. In one preferred form of the method, the voltage impressed on the electrodes is maintained constant, and the flow of current through the cell is caused to be proportional to the concentration of the electrochemically active substance.

In accordance with the above-indicated preferred method of measuring the concentration of the electroactive component, which method is of the amperometric type, the conditions in an electrochemical cell are so adjusted that the current through the cell is proportional to the concentration of only a single component of the mixture. All of the necessary reactants of the enzyme reaction, except the catalyst, are then caused to be initially present, the relationship being such that none of the initially-present reactants can react with the sensing electrode. The current output will then be substantially constant, and close to zero. Only when the enzyme is introduced will the selected reaction begin.

The relationship is caused to be such that one of the products of the primary catalyzed reaction can react readily at the electrode, so that the current between the electrodes in the cell will increase as the reaction proceeds. The change in current is then measured as a function of time, so that the rate of reaction is determined. The reaction rate is then related to the activity of the enzyme, by means of Equations 3 and 5.

As described above, relative to the kinetics of the reaction, the concentrations of the initially-present reactants (substrates) are caused to be relatively large in comparison to the concentration of the enzyme (the enzyme being saturated with both substrates). Furthermore, the electrometric measurements are made during the initial stages of the reaction. Thus, a high degree of sensitivity is achieved.

In accordance with another preferred form, an amperostatic method (wherein the current is maintained constant, and the change in potential of the sensing electrode is measured) is employed to measure the concentration of the electroactive substance. Potentiometric measurement (measurement of the open-circuit potential of the sensing electrode) may also be utilized, but is much less sensitive and quantitative.

Specific examples of the numerous enzymes which may be the subject of the present method are given at the beginning of this specification. Examples of various forms in which the enzymes may be present, and of the manner of their preparation, are stated subsequently. In performing the present method, the operator first decides what enzyme or enzyme system (combination of enzymes) is to be tested. He then selects a substrate which is compatible with the selected enzyme (that is to say, a substrate which the enzyme will act upon in the desired manner), the particular enzyme-substrate combination being determined empirically. Examples of the numerous substrates which may be employed are glucose, pyruvate, succinate, acetate, citrate, a-ketoglutarate, and malate.

Having determined the enzyme-substrate combination, the operator then proceeds to select a cosubstrate which will react with such enzyme-substrate combination in the necessary manner. It is pointed out that the reaction between the substrate and cosubstrate must be one which is thermodynamically possible, since the enzyme will only affect the rate of the reaction and will not make possible a reaction which otherwise could not occur.

The cosubstrate is, in accordance with the present method and as previously indicated, a redox couple. The selected redox couple must be one which is capable of being used as the cosubstrate by the enzyme being tested. Furthermore, as will be set forth below, the redox couple should, if the enzyme system being tested is present in living microorganisms, be capable of satisfying certain metabolic requirements of such microorganisms. Various compounds (normally organic) have been found by applicants to satisfy the above and other requirements for the cosubstrate (redox couple).

The redox couples employed by applicants are often dyes, such as methylene blue, 2,6-dichloroindophenol, indigo disulfonate, phenosafranin, and phenazine methosulfate. In addition to the above-stated requirements, the utility of any redox couple depends upon the rate of reaction with the particular substrate and the enzyme employed, the solubility of the redox couple in the solution, the toxicity relative to the biochemical matter present in the solution, etc.

It is to be understood that the present method also comprehends selecting first the enzyme-redox couple combination, and thereafter selecting a substrate compatible with both.

Reference will next (and in other portions of this specification) be made to the reaction between glucose oxidase (the enzyme catalyst), glucose (the substrate), and methylene blue (the redox couple and cosubstrate). The specified reaction is discussed merely for purposes of illustration and example, and not limitation, it being understood that it would be possible (but less clear and understandable) to discuss the various considerations in general terms. The dye methylene blue (or other redox couple) reacts with glucose, in the presence of glucose oxidase, in such manner as to substitute for oxygen as an oxidizing agent.

The expression for the above reaction is:

$$\text{Glucose} + \text{Oxidized methylene blue} \xrightarrow{\text{Glucose oxidase}}$$
$$\text{Gluconolactone} + \text{Reduced methylene blue}$$

(6)

Under proper conditions, the reduced (leuco) methylene blue can be oxidized electrochemically and quantitatively at an anode, without interference with any other component of the mixture. The electrode current thus produced is proportoinal (assuming that the amperometric method is employed) to the concentration of the reduced methylene blue. Accordingly, the rate of change in the current is proportional to the enzyme activity, the concentrations of the glucose and of the methylene blue being known.

From the above it will be understood that a substance (a redox couple such as methylene blue) is employed which is reduced (or oxidized) in the course of the reaction to a product which reacts electrochemically and rapidly with an electrode. The rate of change in the concentration of the substance is followed, instantaneously and continuously, by measuring the current flowing through the electrochemical cell. The current change indicates enzyme activity, in a quantitative manner.

The electrode potential is so selected, relative to a reference electrode (as will be described subsequently), that the current is proportional to the concentration of leuco methylene blue (as one of numerous examples), and the rate of increase of current is proportional to the rate of increase of concentration of the leuco dye. The electrode potential and other factors (such as relative concentrations) are also so adjusted that the rate of change of concentration of the leuco dye is proportional to enzyme activity.

Various methods may be employed to obtain an electrochemical response related to the concentration of a substance (such as leuco methylene blue) in solution. Applicants prefer a method of amperometric analysis by which a solid platinum or other suitable noble metal electrode is employed. Mercury may also be used, but the possibility is present that the enzyme or some other component of the system might be poisoned by mercury ion in solution. The details of amperometry are well known and need not be set forth at length herein. It is merely necessary to note that applicants prefer to employ a platinum microelectrode which is kept in rapid motion relative to the solution, and adjust parameters in such manner that the current density resulting from the presence of reduced (leuco) methylene blue (as one example) is proportional to the concentration thereof. The electrode may be rotated or vibrated, or the solution may be circulated, or both, in order to achieve the desired degree of relative motion.

As above indicated, it is necessary to adjust the electrode potential in such manner that the current is proportional to the concentration of the electroactive substance or redox couple, for example leuco methylene blue. Such potential may be determined empirically. It is pointed out that for many electroactive substances, there exists an electrode potential or range of potentials within which the substance is either oxidized or reduced, and within which the electrode current is proportional to the concentration of the active species. The choice of electrode potential is influenced by various considerations additional to the one indicated above. Thus, the potential cannot be such as to decompose the solvent (conductive medium), supporting electrolyte, or any component other than that desired. For example, when water is the solvent, the working electrode potential must not be sufficiently positive to oxidize water to oxygen, or sufficiently negative to reduce water to hydrogen.

The potential selected cannot be one at which a reactant entering the reaction is oxidized or reduced at a rate which is significant relative to the rate of the primary reaction being followed. It is possible to operate at a potential which theoretically, according to thermodynamic principles, should result in an electrochemical reaction with the electrode, but which for one or more reasons is such that the rate of the reaction is negligible relative to the rate of the desired electrode reaction. Thus, many organic substances should, theoretically, be oxidized over a range of electrode potentials extending from that of the hydrogen electrode to that of the oxygen electrode and beyond, yet in the absence of specific electrode catalysts essentially no reaction takes place. This behavior makes possible selective analysis for one component of a mixture, by proper choice of electrode and electrode catalyst. Conversely, the absence of the proper catalyst can result in the absence of current despite the fact that a current would theoretically be expected.

In summary, therefore, by empirical determination of the potential of the working electrode, the catalyst composition, and other factors, the relationships are caused to be such that substantially no current will flow when the concentration of a selected electroactive species (for example, leuco methylene blue) is zero.

Applicants have found that the electrode potential which is most suitable for use with reduced methylene blue is 0.0 volt relative to a saturated calomel electrode (SCE). Good results are obtained as long as the electrode potential is within the range of $-0.1$ to $+0.1$ volt vs. SCE. At more negative potentials the oxidized form of methylene blue is reduced, whereas at more positive potentials other substances are oxidized in addition to reduced methylene blue.

The current obtained from an electrode at the above potential, and in contact with the reduced methylene blue, depends upon factors including the concentration of the reduced methylene blue, the area of the electrode, the rate of rotation of the electrode, and the temperature. Thus, a concentration of $10^{-5}$ M reduced methylene blue, and a microelectrode having an area of 0.1 sq. cm., rotated at 600 r.p.m., produced (at 22 degrees C.) a current of 1.5 microamperes. Such current, and the optimum electrode potential, are somewhat related to the pH of the solution.

The optimum pH depends upon the enzyme system being tested, and upon the nature of the electrochemical reaction taking place. For the glucose-glucose oxidase-methylene blue reaction, a pH of 7.0 was found to be satisfactory. In order to fix the pH, the use of a buffer solution is preferred. Various buffers may be used, but for effective buffering action at pH 7.0, applicants prefer a phosphate buffer adjusted to pH 7. Such phosphate buffer is prepared as follows: Stock solutions of (a) 0.1 M potassium dihydrogen phosphate ($KH_2PO_4$), and of (b) 0.1 M di-potassium hydrogen phosphate ($K_2HPO_4$) are made up. These two solutions then may be mixed in different proportions to give solutions buffered at different pH values. A pH of 7 is obtained by mixing in the ratio of four parts of solution (a) to six parts of solution (b), by volume.

The described buffer solution is one form of the "compatible conductive medium" referred to in the appended claims. The word "compatible" is intended to denote an absence of harmful effects upon enzyme activity, etc.

The enzyme-catalyzed reactions upon which the method depends take place within the temperature range from 0 to about 40 degrees C. The rate of the reaction increases as the temperature increases, hence the method becomes more sensitive in a given time period as the reaction temperature is raised. Rates at normal room temperatures (20–23 degrees C.) are rapid enough for most purposes. At about 40 degrees C. many enzymes become denatured and thereby cease their activity.

The present method is preferably performed under oxygen-free conditions. Thus, oxygen and any other chemical oxidizing agents comparable to oxygen should be removed from the solution prior to the making of an electrometric measurement. If oxygen were permitted to be present, it would: (1) react as a substrate in competition with the redox couple which is employed, (2) oxidize the reduced form of the redox couple and thus interfere with the electrochemical part of the analysis, and (3) create its own "oxygen current" as described below.

The oxygen to be removed will normally be present as a dissolved gas, and may be eliminated either by contact with a chemical reducing agent, or by purging with an inert gas. The latter method is preferred because there is then substantially no possibility that contaminants will be introduced. As will be described subsequently, the results of the purging step are indicated electrically by the apparatus shown in FIGURE 1, prior to the time of commencement of the reaction.

It is to be understood that the method may be carried out in ways other than described above. For example, it is possible, but less convenient, to adjust the potential of the working electrode so that the current is proportional to the oxidized form of the redox couple (such as methylene blue). Thereafter, for example, the decrease in current is measured as the oxidized form (such as oxidized methylene blue) is reduced to the reduced form (such as leuco methylene blue).

Purified enzyme preparations or enzyme systems (groups of enzymes), and also various naturally-occurring organisms and substances exhibiting enzyme activity, can be measured by the present method. Thus, for example, whole living cells of micro- and macro-organisms can be assayed for enzyme activity as will be described hereinafter. Fragments and fractions of such cells can also be assayed. Therefore, and because the enzyme activity characteristic of a given number of cells is known or can be determined by known assay methods and visual cell-counting techniques, the activity as measured by the present electrical method may be interpreted in terms of cell population or cell weight. Applicants have tested various forms of enzyme activity, including pure enzymes, extracts and fractions of whole cells, and whole cells, and have found the method to be applicable to all forms tested.

In working with whole cells or cellular masses, applicants may prepare the sample in a fine form of subdivision, but without destroying the characteristic enzyme activity of the cells themselves. This may be done by various methods such as ultrasonic vibration, grinding, shearing, etc.

Cell-free extracts may also be utilized, as will be described subsequently, being prepared by well-known methods. For example, the cell walls may be dissolved using appropriate enzymes, or crushed under high pressure, followed by centrifugation to remove the solids.

It is also within the scope of the present method to determine enzyme activity in various tissues and membranes, that is to say in cells which are in an organized relationship.

DESCRIPTION OF APPARATUS FOR USE IN PERFORMING THE PRESENT METHOD, AND FURTHER DESCRIPTION OF THE METHOD

The method of detecting and measuring enzyme activity, and methods to be described hereinafter, may be better understood by reference to a simple and general form of apparatus by which the methods may be performed. Stated generally, the apparatus consists of an electrolytic cell, means for passing current through the cell, means for measuring and controlling the potential of one electrode in the cell, and means for measuring the current flow through the cell.

Figure 1:
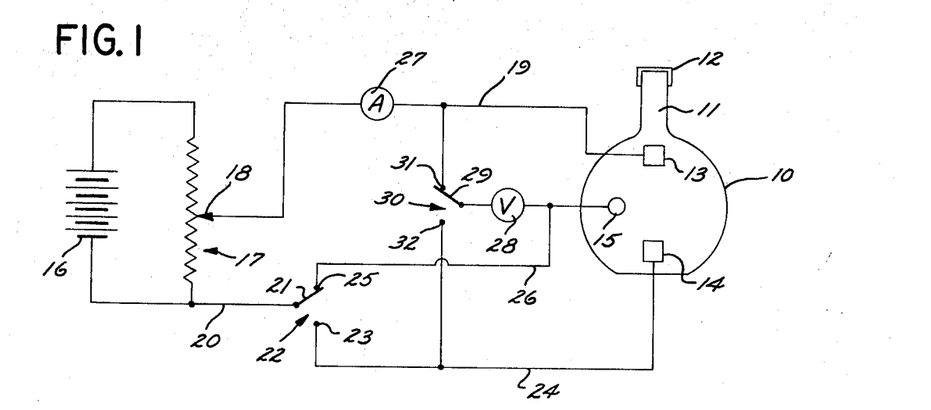
FIGURE 1 is a schematic representation of one form of apparatus for performing the method of the invention.

Referring to the schematic representation of FIGURE 1, the cell or container, which is preferably made of glass, is denoted by the reference numeral 10. Such cell has a neck or port 11 through which the various solutions and the sample are introduced, the neck being sealed against entrance of air by means of a cap or stopper 12. Provided within the cell or container are noble metal electrodes 13 and 14 and also a reference electrode 15, the latter being utilized to determine the proper potential of either one of electrodes 13 and 14.

Electrodes 13–15 may be connected to a suitable source of potential, for example the battery which is indicated at 16, by means of circuitry including a potentiometer 17 the slider 18 of which may be adjusted in order to achieve the required electrode voltage. Stated more definitely, slider 18 is connected through a lead 19 to electrode 13, whereas the junction between the battery and the lower terminal of the winding of potentiometer 17 is connected through a lead 20 to the pole 21 of a single-pole double-throw switch 22. One terminal 23 of switch 22 is connected through a lead 24 to electrode 14, whereas the remaining terminal 25 of the switch is connected through a lead 26 to reference electrode 15.

When switch 22 is in the indicated position, with pole 21 engaging terminal 25, the voltage source is impressed across electrodes 13 and 15. Upon shifting of pole 21 until it contacts terminal 23, the voltage source is impressed across electrodes 13 and 14.

An ammeter 27 is interposed in lead 19 in order to measure the flow of current through cell 10, the current pasing between electrode 13 and one or the other of electrodes 14 and 15. A voltmeter 28 is connected in circuit between reference electrode 15 and the pole 29 of a second single-pole double-throw switch 30. Terminals 31 and 32 of switch 30 are connected, respectively, to leads 19 and 24.

When switch 30 is in the position shown in the drawing, with pole 29 engaging terminal 31, voltmeter 28 measures the potential difference between electrodes 13 and 15. Upon shifting of pole 29 until it contacts terminal 32, the potential difference between electrodes 14 and 15 is determined. Thus, the voltmeter may be employed to determine the potential difference between reference electrode 15 and either of electrodes 13 and 14, depending upon whether a controlled anode or a controlled cathode is used for the analysis.

In the illustrated circuit, the electrode 13 is connected (through the winding or resistor portion of potentiometer 17) to the positive side of the battery 16, or other suitable D.C. voltage source, and therefore serves as the anode of the cell. Such electrode 13 may be termed the "sensing electrode."

Let it be assumed that a solution containing the substrate and the redox couple, in a buffered medium, has been introduced into the cell. Such solution is purged free of dissolved oxygen by passing therethrough a stream of a suitable gas, such as oxygen-free nitrogen or argon. The purging gas is passed through the cell by means of suitable connections and conduits, not shown.

It is a feature of the invention that the circuitry which is employed for the electrolytic method is also employed to determine the substantial absence of oxygen from the cell. This may be accomplished as follows. The pole 21 of switch 22 is closed to terminal 23, so that current will flow through the cell between electrode 13 and electrode 14. Pole 29 of switch 30 is closed to terminal 31, so that voltmeter 28 measures the potential of sensing electrode 13 relative to reference electrode 15. Slider 18 of potentiometer 17 is then adjusted until voltmeter 28 reads, for example, 0.0 volt (when the reference electrode 15 is a saturated calomel electrode).

Oxygen present in cell 10 will then cause current to flow therethrough between electrode 13 and electrode 14, despite the absence of the catalyst (or substrate) required to produce the desired electroactive product. Such current has a polarity opposite to that associated with the production of an electrochemical reducing agent due to the action of the catalyst.

The current flow is oberved during continuance of the purging operation, the latter being discontinued when the current flow resulting from the presence of oxygen is sufficiently low (in comparison with the current expected from the performance of the analysis method) that the error is tolerable. For most applications, a residual current of $10^{-8}$ amperes per sq. cm. of electrode area is not harmful.

After the current resulting from the presence of oxygen in the test fluid has been reduced to a negligible level, the sample (enzyme) to be measured is introduced into the cell. This should be done in such a manner as to prevent introduction of a substantial amount of oxygen. If the sample volume is comparable to the cell volume, the sample is first deaerated by purging with oxygen-free nitrogen, for example for 10–30 minutes. If the sample volume is relatively small, no such deaeration may be necessary. A syringe and hypodermic needle are convenient for injecting the sample. A rubber septum may be provided to permit entrance of the needle through the wall (or stopper) of the cell.

Immediately after introduction of the sample, switch 22 is shifted until pole 21 engages terminal 25. The reference electrode 15 then serves as a cathode for the anode 13, and also as a reference electrode to measure the potential of electrode 13. The current flowing through the cell from electrode 13 to electrode 15 is then measured by ammeter 27, as a function of elapsed time. The rate of change in current is then correlated to enzyme activity.

It is at least equally satisfactory to employ electrode 14, not reference electrode 15, as the cathode during the measurement indicated in the preceding paragraph (in which case switch 22 is left in its original condition, with pole 21 contacting terminal 23). In the specific examples given below, electrode 14 is the cathode.

To obtain accurate results, the potential of the sensing electrode is maintained constant throughout any one determination. This adjustment may be made, for example, by manually or automatically shifting the slider 18 as required. Alternatively, the voltmeter 28 and the voltage source 16–17 may be replaced by an electronic unit, known as a "potentiostat," which maintains the voltage constant. The extent to which the potential must be maintained constant depends upon the activity of the sample. For very low activity, regulation to within one millivolt is required. Where the activity is substantially greater, a proportionately less regulation is necessary, but variations greater than 5 millivolts are not desirable.

The length of time required to make a determination, by means of the present method, is inversely proportional to the activity of the sample tested. To achieve reliable results, it is preferred to perform the method until a change of current of at least $10^{-8}$ amperes per sq. cm. of electrode area has occurred. For highly active samples, this change is produced in less than 30 seconds, whereas for dilute samples several hours may be required. It has been found that, for most solutions of industrial importance, the determination can be completed in less than 15 minutes.

As one specific of the method and apparatus described above, relative to a substantially purified enzyme, the meansurement of the activity of glucose oxidase at 22 degrees C. was performed as follows: 100 ml. of buffer solution were made up by mixing 40 ml. of 0.1 M $KH_2PO_4$ solution with 60 ml. of 0.1 M $K_2HPO_4$ solution. 18 mg. ($10^{-4}$ mol) of D-glucose, and 0.37 mg. ($10^{-6}$ mol) of methylene blue, were dissolved in the solution. The resulting solution was introduced into the cell 10, following which the potential of the rotating platinum electrode (0.1 sq. cm. in area, 600 r.p.m.) was adjusted to 0.0 volt relative to the saturated calomel electrode 15. A cathodic current of greater than 1 microampere ($10^{-6}$ amperes) was observed to flow through the cell.

A stream of purified nitrogen was then passed through the solution, whereupon the current began to decrease. After approximately 20 minutes, the current became constant at $0.5 \times 10^{-8}$ amperes.

A glucose oxidase preparation assaying at 22 enzyme units (micromoles $O_2$ per minute) per mg. was then added to the cell by means of a hypodermic needle, the amount being 10 mg. Within about 10 seconds the current began to increase, flowing through the cell from anode 13 to cathode 14, and within about 30 seconds was changing at a constant rate. At the end of the 10-minute period immediately following introduction of the enzyme, the current was $1 \times 10^{-7}$ amperes and was still increasing in a linear fashion. The measurement was terminated at this point. The rate of change over the linear portion of the curve of current vs. time was $1.0 \times 10^{-8}$ amperes per minute. It is thus known that approximately one enzyme unit produces a change in current of $4.6 \times 10^{-10}$ amp./min.

As another specific example, the activity of the enzyme "alcohol dehydrogenase" was tested as follows: It was first determined that a solution of the enzyme with its substrate ethanol rapidly decolorized the dye phenosafranin in the presence of the coenzyme diphosphopyridine nucleotide (DPN) and xanthine oxidase. The latter are known from the literature to be required for continuous reactions involving alcohol dehydrogenase. Furthermore, the pure oxidized form of phenosafranin gave no appreciable current at the rotating platinum anode $-0.4$ volt vs. SCE, whereas the reduced form gave a measurable current proportional to the concentration of reduced dye.

The measurement of enzyme activity was therefore performed by preparing a solution of 0.2 M ethanol, 0.01 M DPN, 0.01 M phenosafranin, and containing 200 enzyme units per ml. of xanthine oxidase in 0.1 M glycine buffer. This solution was deaerated with a stream of oxygen-free nitrogen until the anode current at a potential of $-0.4$ volt vs. SCE was less than $10^{-9}$ amperes. Alcohol dehydrogenase was then added to give concentration of 0.05 mg. per ml. in the cell. After the third minute the current through the cell was changing at a constant rate of $7 \times 10^{-8}$ amperes per minute. It is therefore known that approximately one microgram per milliliter of alcohol dehydrogenase will cause a change in current of $1.4 \times 10^{-9}$ amp./min.

METHOD OF DETERMINING MICROBIAL POPULATIONS

In accordance with one major aspect of the present invention, and as mentioned heretofore, the populations of microorganisms may be determined in a simple, accurate and sensitive manner. The determinations are based upon the fact that each cell contains approximately the same amount of certain enzymes as each other cell. Very importantly, applicants have discovered that the action of these enzymes can be measured without destroying or disrupting the cells. This is accomplished by causing the organisms to metabolize in contact with solutions of a known substrate and a predetermined redox couple, while measuring the resultant changes electrochemically.

It is a feature of the method that the populations of anaerobic bacteria may be measured without introducing toxic substances, this being because of the fact that the present method may be performed in the absence of oxygen and other strongly reactive chemicals. On the other hand, relative to aerobic bacteria, applicants have found that performance of the method in the absence of oxygen does not kill the bacteria, nor does it appear to damage the cellular enzyme activity. One reason for this is that a redox couple is employed which satisfies, for substantial time periods, the requirement of the microorganisms for an oxidizing agent.

To determine the populations of live microorganisms, the method is performed as described in detail heretofore, with the very important exception that the various concentrations, the characteristics of the conductive medium, etc., are so determined as to be compatible with the metabolism of the microorganisms. In practice, it is found that bacteria are more tolerant to a range of environmental conditions (e.g., salt content, pH, etc.) than are purified enzyme preparations. On the other hand, many microorganisms, and especially single-cell organisms such as bacteria, are more sensitive to the oxidizing potential of their environment than are isolated enzymes. It is a unique feature of this method that because oxygen (with its overpowering oxidation effects) is not required, the oxidizing potential of the test solution may be accurately adjusted, by proper choice of substrate and redox couple, to be optimum for the particular species of microorganisms to be measured. Thus, for aerobic bacteria, for example, a dye (such as methylene blue) having a redox potential of $-0.25$ volt vs. SCE at pH 7 can be chosen, whereas for anaerobic bacteria, which require a more negative potential, a dye (such as phenosafranin) having a redox potential of $-0.5$ volt vs. SCE can be chosen.

The change in current (at constant anode potential) which occurs after the microorganism is introduced into the cell (in order to commence the reaction) has been found to be a direct and quantitative measure of microorganism population. Thus, for a particular type of microorganism, the ammeter 27 (FIGURE 1) may be calibrated in terms of microorganism population, the current measurement being made a predetermined time period after commencement of the reaction. In the indicated manner, microorganism populations at least in the range of $10^5$ to $10^8$ cells per ml. may be readily determined.

Calibration may be achieved, prior to a given test run, by correlating the resulting rate of change of current with cell population as determined by conventional microscopic (cell-counting) or other techniques. Thereafter, repeated runs may be made, for example relative to a given industrial process, to achieve the desired measurements in a simple manner. It is to be understood that recalibration may be necessary if conditions change, such conditions including, for example, the growth pattern and growth phase of the cells.

The following is a specific example of calibration relative to a determination of the population of the aerobic bacterium *Proteus vulgaris*. A suspension of live, whole cells of *Proteus vulgaris*, containing $2.8 \times 10^8$ cells/ml., was caused to be present in a solution of $10^{-3}$ M D-glucose and $10^{-4}$ M methylene blue. The above-described method was then performed, and resulted in a current change of $2.5 \times 10^{-6}$ amperes per minute during a period of 5 minutes (which period commenced with introduction of the *Proteus vulgaris* solution into the deaerated conductive medium containing the substrate and redox couple). The continued change in current illustrates the continuance of enzyme activity, despite the fact that the microorganisms were deprived of oxygen by the purging operation indicated heretofore.

It will thus be understood that for the specified bacterium, under the conditions present during calibration, a current change of $2.5 \times 10^{-6}$ amperes per minute corresponds to a population of $2.8 \times 10^8$ cells/ml. The calibrating operation is then repeated for various other cell populations, to produce a calibration curve (which is not necessarily linear). With such calibration curve, the populations of various samples of the bacterium are readily determined.

As another example of measurement of the populations of live, whole cells, a sample of a culture of the facultative aerobic bacterium *E. coli*, growing on glucose medium, was injected into an electrochemical cell containing a solution of 0.01 M D-glucose, $7.5 \times 10^{-4}$ M 2,6-dichloroindophenol as the redox couple, and 0.05 M phosphate buffer at pH 7. At 23 degrees C. and an anode potential of 0.0 volt vs. SCE, the rate of change of current was $1.1 \times 10^{-9}$ amperes per minute. The background drift (rate of change in the residual current, namely the current which exists independently of the reaction) was $1.2 \times 10^{-11}$ amperes per minute. Agar plate counts of this solution showed the population to be $6.5 \times 10^7$ cells per ml.

The following is a specific example of the determination of microbial populations relative to live, anaerobic, sulfate-reducing bacterium *Desulfovibrio desulfuricans*. The sample was taken from a culture grown on the following medium: Deaerated sea water to which the following had been added (per liter of water): 0.4 g. ammonium chloride; 0.1 g. potassium hydrogen phosphate; 1 g. yeast extract; 4 g. 60% sodium lactate solution; and 0.1 g. ascorbic acid. The analysis was performed in a solution made up from sterilized nutrient medium of the above composition, to which $10^{-3}$ M phenosafranin had been added. Before injection of the bacterial sample, the current output of the test cell at an anode potential of −0.1 volt vs. SCE was constant within ±$10^{-10}$ amperes per minute. A 0.1 cc. sample of the growth culture was injected into a 1 cc. test volume in a small cell 10. The rate of change of current after the first minute was $1.5 \times 10^{-8}$ amperes per minute. To calibrate, the suspension in the cell was serially diluted and incubated in the presence of excess ferrous ion. The black spots resulting from precipitation of FeS were counted after 14 days. The original population was thus determined to be $2 \times 10^6$ per ml.

There will next be given a specific example of the method as applied to live, whole cells of yeast (as distinguished from bacteria). A culture of yeast cells was prepared by inoculating a glucose medium with a commercially-available yeast product. After incubation for 24 hours at 30 degrees C., the culture was turbid, indicating a high population. Three ml. of an electrochemical test solution was prepared containing 0.05 M phosphate buffer adjusted to pH 8, 0.03 M D-glucose, and $5 \times 10^{-5}$ M phenazine methosulfate. After deaeration of this solution the residual anode current was $10^{-10}$ amperes. A 0.3 ml. sample of the yeast culture was injected into the test cell (approximately 1 to 10 dilution), and the rate of change of current through the cell at an anode potential of 0.0 volt vs. SCE was observed over a 5-minute period. This procedure was repeated using 0.3 ml. samples of the original culture after dilution of the latter with sterile glucose-buffer to provide several lower populations of cells. Each sample was then counted by staining and microscopic examination. The resulting data are shown in the following table:

| Yeast concentration (cells/ml.) $\times 10^{-7}$: | Rate of change of current (amp./min.) $\times 10^8$ |
| --- | --- |
| 5.2 | 2.8 |
| 2.5 | 1.1 |
| 0.5 | 0.3 |

Figure 5:
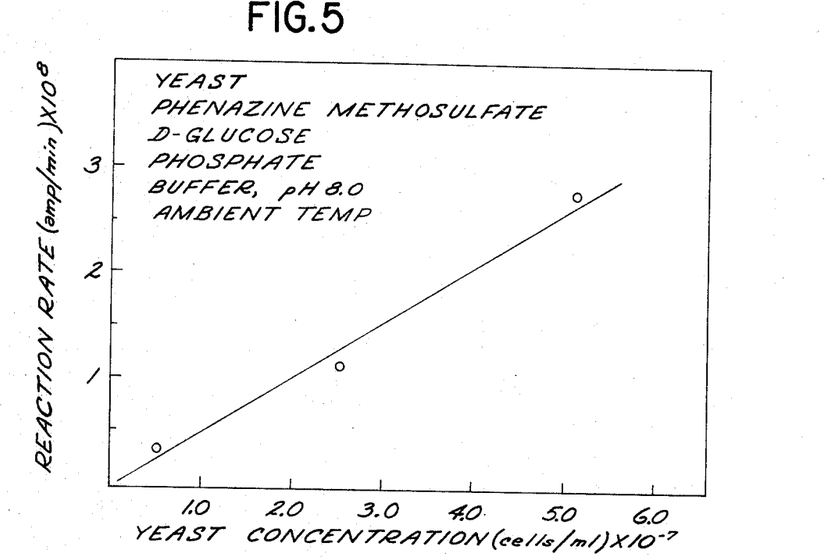

These data fall close to a straight line passing through the origin, as shown in FIGURE 5. A fresh culture was then made up and incubated until visual observation of turbidity indicated that it contained a population of yeast cells in the range of the above data. A sample was then analyzed by the electrochemical method above, whereby a rate of $1.5 \times 10^{-8}$ amperes/minute was observed, corresponding to $3 \times 10^7$ cells per ml. according to FIGURE 5. Actual counting by microscope showed the population to be $3.5 \times 10^7$ cells per ml. The error was well within the usual experimental error for such counting techniques.

There will next be given an example of the method when amperostatic, as distinguished from amperometric, techniques are employed. As stated heretofore, a constant current is passed through the cell, and the potential of the anode 13 (sensing electrode) is followed in order to determine enzyme activity, cell population, etc. Referring to FIGURE 1, the resistor or winding portion of potentiometer 17 is made very large. Furthermore, the voltage applied by the potentiometer 17 (between slider 18 and lead 20) is caused to be such that the current through the cell will be between $10^{-9}$ and $10^{-7}$ amperes and will be independent of the composition of the solution in the cell. This current range is suitable for use with a micro-anode having an area of about 0.1 sq. cm.

Oxygen is first removed from the cell, the absence of oxygen being indicated by a current which is near zero despite placing of a shunt or short from slider 18 to lead 20 (the anode potential during the oxygen-removal step being 0.0 volt vs. SCE). The shunt is then removed, and slider 18 is so adjusted that the potential of electrode 13, as read on voltmeter 28 is approximately +0.5 volt vs. SCE (this voltage is not critical within the limits of +0.3 volt to +0.7 volt). After waiting for the potential to become constant, the sample is injected and the change in the potential of electrode 13 is followed with time, at constant current. Conditions may be adjusted so that a change of several hundred millivolts occurs during the course of the catalyzed redox reaction.

As one specific example, a 0.05 M phosphate buffer solution containing $7.5 \times 10^{-4}$ M 2,6-dichloroindophenol and 0.01 M D-glucose was deaerated as described above. A constant current of $10^{-8}$ amperes was passed through the solution, resulting in an anode potential of +0.47 volt vs. SCE. A suspension of live, whole cells of the bacterium *E. coli* was then added, the cell count being such as to produce a population of $6.5 \times 10^7$ cells per ml. in the mixture. After about one minute, the potential of the anode was changing at a rate of 130 millivolts per minute. Such rate of voltage change was substantially constant for 4 minutes, after which the rate of change began to decrease.

It is emphasized that, as indicated heretofore, the amperostatic method may also be employed for determination of the activity of purified enzymes or cell-free extracts, or for determination of substrate concentration.

From the above it will be understood that the described direct determination of the populations of live, whole microorganisms is simple, direct and accurate, and thus has major importance and utility. Furthermore, and very importantly, the method has been found to be surprisingly sensitive when employed with live, whole cells. It is, however, emphasized that the method may also be employed to determine microbial populations in a different manner, for example by use of cell-free extracts. This involves an additional step, namely the conversion of the live bacterium into cell-free extracts containing the enzymes produced by the bacterial cells.

A predetermined volume of solution containing microorganisms (the population of which is to be determined) is first converted into cell-free extracts, for example by dissolving the cell walls, or preferably by crushing and centrifuging, as indicated previously. The cell-free extracts are then introduced into the conductive medium containing the substrate and redox couple. The rate of change in current is noted, and may be correlated to the populations of microorganisms (to achieve calibration). Correlation is effected by measuring the protein content of the extracts, and relating such protein content to the cell population of the original culture (as determined by plate count, etc.). Thereafter, a large number of runs may be made, utilizing the method as thus calibrated.

As one example of the determination of microbial populations by means of cell-free extracts, 100 ml. of 0.1 M phosphate buffer were made up at $10^{-3}$ M D-glucose and $10^{-5}$ M methylene blue. The resulting solution was introduced into the electrochemical cell and then purged free of dissolved oxygen. A suspension of resting cells of the bacterium *Proteus vulgaris* was extruded from a French press, and the product was centrifuged to remove insoluble cell fragments. Part of the clear supernatant was assayed for protein; a portion of the remainder was then injected into the cell using a volume calculated to produce a concentration of 1.0 mg./ml. of cell protein in the reaction mixture. The rate of change in current was constant after about one minute, and was equal to $0.7 \times 10^{-7}$ amperes per minute over a 15-minute period. One milligram of cell protein was found (by standard cell-counting techniques) to correspond to about $10^9$ cells of *Proteus vulgaris*.

In another, and similar, example relative to measurement of populations of microorganisms, by means of cell-free extracts, a suspension of cell-free extracts from the bacterium *Serratia marcescens*, at 0.44 mg. protein per ml., in solution with $10^{-3}$ M glucose and $10^{-5}$ M methylene blue, produced a current change of $0.9 \times 10^{-7}$ amperes per minute over a 10-minute interval.

A further example of the determination of microbial populations, by means of cell-free extracts, is as follows:

a solution containing $10^{-3}$ M sodium succinate, $10^{-3}$ M methylene blue, and 0.05 M phosphate buffer (pH 7.0) was used to measure the population of the bacterium *Bacillus globigii*. Reaction rates were measured at several concentrations of cell-free extracts, the resulting data being shown in the following table.

| Concentration of cell protein (g./ml.) $\times 10^6$: | Rate of change of current (amp./min.) $\times 10^{10}$ |
|---|---|
| 0.2 | 0.5 |
| 4.0 | 3.5 |
| 6.0 | 6.6 |
| 8.0 | 8.7 |

Figure 2:
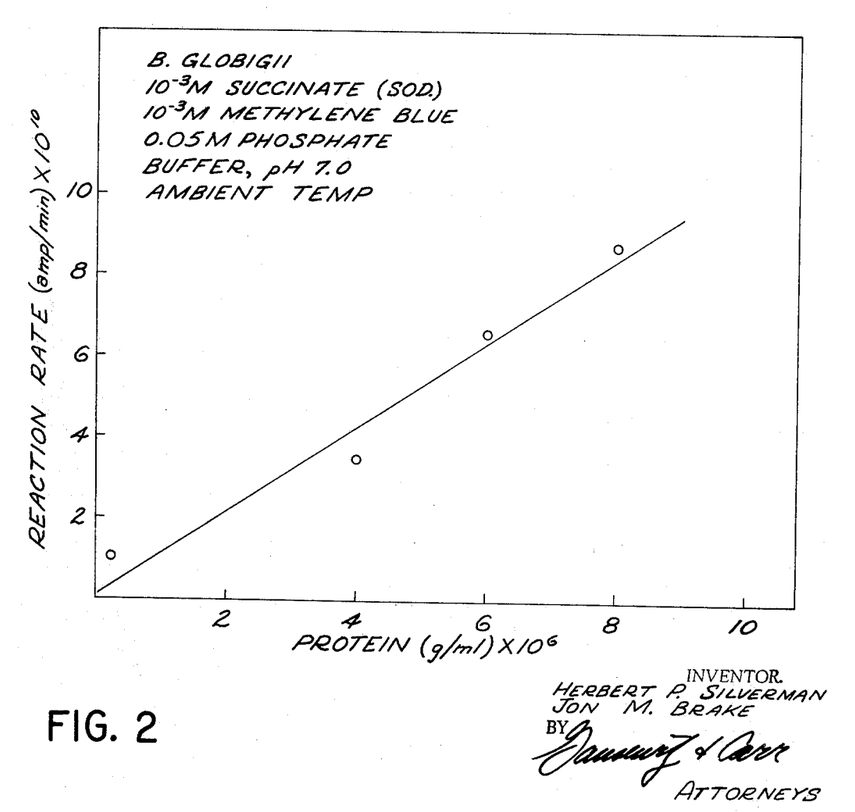
FIGURES 2–6, inclusive, are graphic illustrations of data obtained by the present method.

As shown graphically in FIGURE 2, these data fall nearly on a straight line passing close to the origin. Therefore, the method can be used as a direct and quantitative measure of cell protein. By separate analysis and counting it was determined that 1.0 mg. of all protein from *B. globigii* cells corresponds to $1.5 \times 10^9$ cells.

Figure 3:
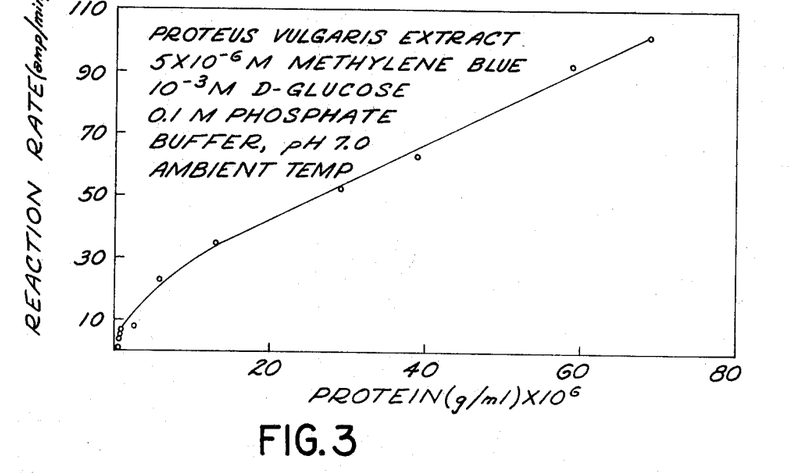
Figure 4:
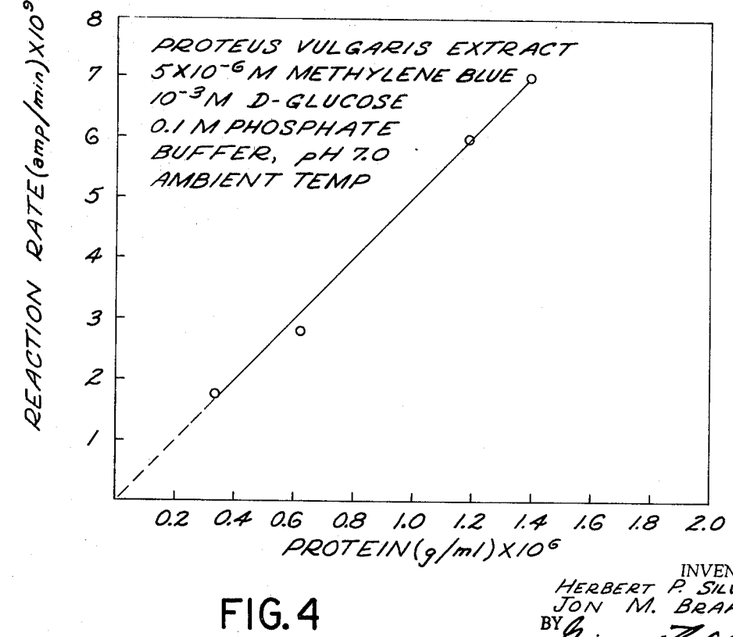

FIGURES 3 and 4 illustrate curves obtained relative to a study of the rate of reduction of $5 \times 10^{-6}$ M methylene blue in 0.1 M phosphate buffer at pH 7.0. The concentration of glucose was $10^{-3}$ M. The rate of reduction of the methylene blue was studied as a function of protein concentration, using *Proteus vulgaris* cell-free extracts.

Referring first to FIGURE 3, it may be seen that the resulting graph has two distinct slopes, the region of higher slope being from 0 to 2 mg./ml. protein, and the region of lower slope being from 5 to 70 mg./ml. protein. The former region is shown, by means of an expanded scale, in FIGURE 4. As illustrated in FIGURE 4, the points fall substantially on a straight line, which line passes very close to the origin. It is emphasized that FIGURE 4, in particular, illustrates the extreme sensitivity of the present method.

The reaction rate represented by FIGURES 3 and 4 may be made greater by carrying out the reaction under optimum conditions, for example at an elevated temperature, such as 40 degrees C., instead of at ambient temperature. In this way, sensitivity may be increased by a factor of two to three.

METHOD OF DETERMINING SUBSTRATE CONCENTRATIONS

As noted above relative to the description of the method of determining enzyme activity, the concentrations of the substrate and redox couple (cosubstrate) are normally such that the enzyme is saturated with each, i.e., higher concentrations of either substrate have no effect on the rate of the reaction. Under these conditions, the amount and activity of the enzyme are what determine the reaction rate. Accordingly, the activity of the enzyme may be determined by a measurement of reaction rate.

In order to determine the concentration of a substrate, the concentrations are altered in such manner that the substrate (not the enzyme) is what determines the reaction rate. To do this, the initial concentration of substrate in the reaction mixture is decreased to the point where the enzyme is no longer saturated with this substance. At any concentration less than this the rate of the reaction is a function of the substrate concentration. Therefore, by using a known and constant amount of enzyme and redox couple, the response of the method can be calibrated in terms of a single substrate. It will be apparent that under the above conditions Equation 4 no longer holds. Instead, another quite similar expression can be derived in which the concentration of the enzyme is part of the proportionality constant relating reaction rate to concentration of the substrate.

The most useful range of enzyme concentration for this purpose is from 0.01 to 1.0 mg. per ml. in the reaction mixture, a concentration of about 0.1 mg. per ml. being preferred. Enzyme preparations having a specific activity in the range of 5 to 50 enzyme units per miligram are suitable. Concentrations of redox couple in the range from $10^{-4}$ to $10^{-2}$ M are preferred.

The concentration of the substance glucose may best be determined at concentrations in the range from $10^{-4}$ to $10^{-3}$ M in the reaction mixture. Concentrations near the upper limit of this range are preferred because the reaction rate is faster there. Concentrations much greater than $10^{-3}$ M tend to saturate the enzyme and thus have a diminishing effect on the rate of the reaction. Thus, in order to analyze solutions more concentrated than $10^{-3}$ M in glucose, the solution is simply diluted with sufficient pure, sterile water (prior to injection of the sample) that the final concentration (after mixing with the test solution) is between $10^{-4}$ and $10^{-3}$ M.

It has been found that some redox couples deactivate certain enzymes unless the substrate is also present. For example, a sufficient concentration of methylene blue will deactivate glucose oxidase unless glucose is also present. Because of the latter factor, the enzyme and glucose may be added simultaneously to methylene blue, instead of following the more normal procedure of adding the glucose to a mixture of the enzyme and methylene blue.

The following is a specific example of the determination of the concentration of glucose by the present method: Ten ml. of phosphate buffer solution containing 1.0 mg. of a commercially available glucose oxidase product having a specific activity of 22 enzyme units per mg. were deaerated by purging with argon in an electrolytic cell, the cell being operated as a dissolved oxygen analyzer in the manner described above. When the solution was free of oxygen, 1.0 ml. of the sample containing the glucose to be determined and 2 mg. of methylene blue was injected by means of a hypodermic syringe. The rate of change of current at an anode potential of 0.0 volt vs. SCE was observed until a constant rate was obtained. This procedure was used on several samples of different glucose concentrations, with the following results:

| Glucose concentration after dilution (g./ml.) $\times 10^3$: | Rate of constant of current (amp./min.) $\times 10^7$ |
|---|---|
| 0.01 | 0.6 |
| 0.02 | 1 |
| 0.03 | 1.5 |
| 0.05 | 2.2 |
| 0.1 | 3.7 |

Figure 6:
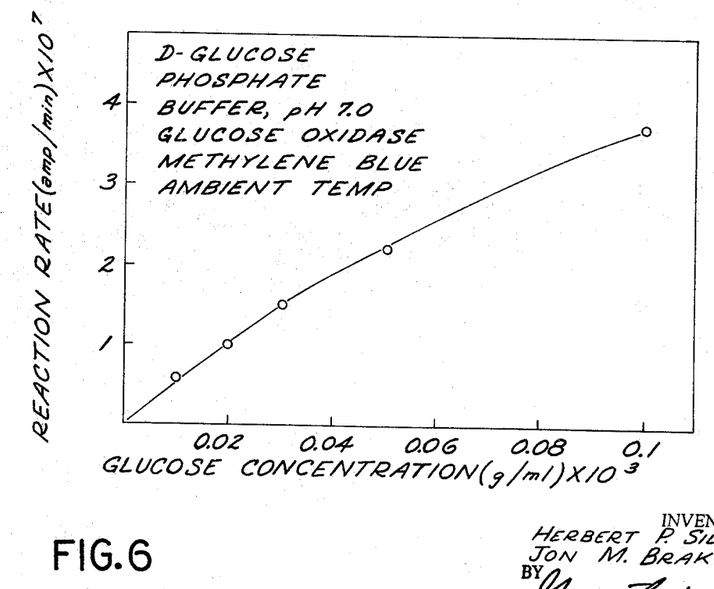

The above is plotted in FIGURE 6.

DESCRIPTION OF THE METHOD RELATIVE TO ENZYMES OTHER THAN OXIDATION-REDUCTION ENZYMES

The activity of enzymes other than redox enzymes may also be measured, by employing an extension of the present method. Such extension makes use of sequential reactions.

The activity of hydrolytic enzymes, for example, may be measured by conducting a reaction catalyzed by the enzyme to be measured in the presence of a second enzyme-catalyzed reaction, the latter involving a substrate which is a product of the former reaction. The second reaction is of the redox type relative to which the described electrochemical method is directly applicable.

For example, the action of the proteolytic enzyme pepsin on the gastric juices produces a mixture of peptones, peptides and simple amino acids. To determine the activity of pepsin, conditions are so adjusted that the rate of the pepsin-catalyzed reaction is limiting, and is determined by the activity of the pepsin. Conditions are also so adjusted that the amino acids resulting from the first reaction are employed (by the above-described method, using a reversible redox couple and the redox enzyme amino-acid oxidase) to create an electrical signal. The electrical read-out thus generated is proportional to pepsin activity.

As another example, the activity of the enzyme amylase may be measured as the catalyst for the decomposition of starch into smaller fragments, such fragments including reducing sugars. The expression for this reaction is as follows:

It has been found that, where purified enzyme preparations of about the same specific activity are employed, the rate of the overall reaction, (7) plus (8), is dependent upon the activity of amylase (i.e., the first reaction is rate-limiting) if the ratio of glucose oxidase to amylase is at least two (as measured by the amount of protein in the preparations employed). Preferred redox couples for the above-indicated reaction are phenazine methosulfate and 2,6-dichloroindophenol, as they react more rapidly with glucose, in the presence of glucose oxidase and similar oxidative enzymes, than do others.

The following is a specific example of such sequential reactions, relative to a determination of the activity of the hydrolytic enzyme amylase: Three ml. of solution of 0.05 M phosphate buffer adjusted to pH 5.5 were prepared containing 0.5% starch, 0.15 mg. glucose oxidase (specific activity 22 enzyme units per mg.) and 0.06 mg. amylase. This mixture was tested for reactivity by first performing a manometric assay on a Warburg apparatus. The solution consumed 1.3 microliters of oxygen per minute at 25 degrees C., indicating that the sequential reactions were taking place as desired.

Another solution was prepared containing only 0.03 mg. amylase, the other constituents being the same. This solution was placed in the cell, deaerated with argon, and then 1.0 mg. of phenazine methosulfate was added. The cell current was followed at an anode potential of 0.0 volt vs. SCE. After a few minutes the current was observed to change at the rate of $3 \times 10^{-9}$ amperes per minute. This rate was proportional to the concentration of amylase, in the range from 0.01 to 0.15 mg. per ml.

Relative to the terminology employed in the appended claims, it is pointed out that various claims are written in terms of the normal method of proceeding, namely introducing the sample (whether it be enzyme or substrate) into a previously-prepared mixture of the remaining components. It is, however, emphasized that the manner or order of mixing of various components has no bearing upon the infrnigement or noninfringement of the claims. Thus, for example, and as above noted, it is possible to mix the enzyme with the substrate and then introduce such mixture into the redox couple, for example when the redox couple would deactive the enzyme in the absence of the substrate.

It is within the scope of the invention to employ flow-stream apparatus, for example, instead of the described cells or containers.

The words "enzyme," "enzyme system," etc., as employed in the claims, denote purified enzyme preparations, cell-free extracts, whole cells, etc.

The redox couple is regarded as one of the "substrates" for purposes of the present specification and claims. Furthermore, the enzyme is regarded as a "component" of the reaction.

The present method relates to both qualitative and quantitative analysis. Thus, when reference is made to "introducing" a certain substance into the electrolytic cell, such expression also relates to the introduction of a substance the composition of which is totally unknown, in order to determine whether or not any of the certain substance (such as an enzyme) is present.

A "redox couple" is hereby defined as a material which serves as a substitute for the natural electron acceptor (for example, oxygen in the case of aerobic bacteria, and sulphate in the case of anaerobic sulphate-reducing bacteria) in the reaction of interest.

An "electrochemically-reversible redox couple" is hereby defined as a redox couple forming a component of a reaction which can, by a relatively small change in the electrical potential, be made to proceed in either direction.

It is pointed out that the invention is not limited, in all cases, to the removal of oxygen. Operation in the presence of oxygen is possible in those cases where the reaction of the oxygen with the reduced form of the redox couple is much slower than the enzymatic reaction with the redox couple. For example, the reduced form of the redox couple, 2,6-dichloroindophenol satisfies this requirement when reacted with glucose oxidase.

Unless stated otherwise, each of the above specific examples was performed at 23 degrees C., using a platinum microelectrode having an area of 0.1 sq. cm., and rotated at 600 r.p.m. The specific examples relative to the redox couple methylene blue were performed at an anode potential of 0.0 volt vs. SCE.

The foregoing detailed description is to be clearly understood as given by way of illustration and example only, the spirit and scope of this invention being limited solely by the appended claims.

We claim:
1. A method of analysis for one of the components in an enzyme-catalyzed reaction, which comprises:
providing an enzyme, a first substrate, and a second substrate,
said first substrate being a redox couple having a predetermined initial oxidation state,
said redox couple being selected from a group consisting of methylene blue, 2,6-dichloroindophenol, indigo disulfonate, phenosafranin, and phenazine methosulfate,
said redox couple, said second substrate and said enzyme being adapted to react chemically and change the oxidation state of said redox couple from said predetermined initial oxidation state to an oxidation state different therefrom,
effecting a chemical reaction between said redox couple, said second substrate and said enzyme to thereby effect said change in the oxidation state of said redox couple from said predetermined initial oxidation state to said different oxidation state,
electrochemically determining the resulting change in the oxidation state of said redox couple, and
employing the result of said electrochemical determination to analyze for one of the components of said chemical reaction.

2. The invention as claimed in claim 1, in which said electrochemical determination is effected by means of amperometric analysis.

3. The invention as claimed in claim 1, in which said electrochemical determination is effected by means of amperostatic analysis.

4. The invention as claimed in claim 1, in which said enzyme is selected from a group consisting of glucose oxidase, aldehyde oxidase, zanthine oxidase, L-amino acid oxidatse, alcohol dehydrogenase and lactic dehydrogenase.

5. A method of making a quantitative analysis relative to the activity of an enzyme other than a redox enzyme, which comprises:
providing a redox couple, a redox enzyme, and a substrate in a conductive medium compatible therewith,
said substrate being nonreactive with said redox couple and redox enzyme,
said substrate being adapted, when acted upon by a predetermined enzyme other than a redox enzyme, to be converted to a different substrate,
said different substrate being adapted to react with said redox couple, in the presence of said redox enzyme, to thereby change the oxidation state of said redox couple, providing first and second electrodes in said medium, introducing said predetermined enzyme into said medium, conducting sequential chemical reactions by which said substrate is converted to said different substrate due to the catalytic action of said predetermined enzyme, and said oxidation state of said redox couple is changed due to the action of said different substrate and said redox enzyme, said sequential reactions being conducted under such conditions, relative to concentrations and other factors, that the rate of change in the oxidation state of said redox couple is proportional to the rate of conversion of said substrate to said different substrate, employing said electrodes to determine electrochemically the rate of change in the oxidation state of said redox couple, and correlating the thus-determined rate of change in the oxidation state of said redox couple to the activity of said predetermined enzyme.

6. The invention as claimed in claim 5, in which said predetermined enzyme is a hydrolytic enzyme.

7. The invention as claimed in claim 5, in which said predetermined enzyme is a proteolytic enzyme.

8. A method of quantitative determination of the activity of an enzyme system, comprising:

mixing relatively large concentrations of a substrate and a redox couple in a compatible buffered medium contained within a closed receptacle, said couple being present in the oxidized form thereof, said couple and substrate being adapted, when catalyzed by the enzyme system to be analyzed, to react and convert said couple into the reduced form thereof, said couple being selected from a group consisting of methylene blue, 2,6-dichloroindophenol, indigo disulfonate, phenosafranin, and phenazine methosulfate, providing first and second electrodes in said medium, treating said substrate, redox couple and medium to remove substantially all oxygen therefrom, connecting said electrodes in a circuit with a voltage source, adjusting the potential of a predetermined one of said electrodes to such value that: (a) the flow of current in said circuit is at a predetermined level, and (b) the flow of current in said circuit will change substantially upon conversion of said couple into the reduced form thereof, introducing into said receptacle a relatively small concentration of said enzyme system to be analyzed, while preventing introduction of substantial oxygen therein, said concentrations of said enzyme system, substrate and redox couple being correlated to each other and to factors including said potential of said predetermined electrode in such manner that: (a) the current flow in said circuit will be proportional to the concentration of the reduced form of said redox couple, and (b) the concentration of the reduced form of said redox couple will be proportional to the activity of said enzyme system, effecting a chemical reaction between said redox couple and substrate and catalyzed by said enzyme system, thereby effecting progressive conversion of said redox couple from the oxidized form thereof to the reduced form thereof, measuring the rate of change in current flow in said circuit as said reaction progresses, and correlating said rate of change to the activity of said enzyme system.

9. The invention as claimed in claim 8, in which said method further comprises providing a third electrode in said medium, one of the three electrodes being a reference electrode, and employing said reference electrode to determine the potential of said predetermined one of said electrodes.

10. The invention as claimed in claim 8, in which said substrate is glucose, and said enzyme is glucose oxidase.

11. The invention as claimed in claim 8, in which said measurement of the rate of change in current flow is made during the initial stages of the reaction.

References Cited

UNITED STATES PATENTS

| 3,228,799 | 1/1966 | Rohrback | 360—100 |
| 3,275,534 | 9/1966 | Cannon et al. | 204—1.1 |
| 3,336,161 | 8/1967 | Sutton et al. | 136—86 |
| 3,367,849 | 2/1968 | Baaedel et al. | 204—1.1 |
| 3,403,081 | 9/1968 | Rohrback et al. | 204—1.1 |

OTHER REFERENCES

Bladel et al.: "Analytical Chemistry," vol. 34, No. 3, March 1962, pp. 388–394.

Potter: "Proc. Royal Soc. London (Series B), Biological Papers," vol. 84, March 1912, pp. 260–270, 273–276.

TA-HSUNG TUNG, Primary Examiner

U.S. Cl. X.R.

195—103.5